United States Patent
Adib et al.

(10) Patent No.: US 9,253,652 B1
(45) Date of Patent: Feb. 2, 2016

(54) AD HOC FORMATION OF A SWARM FOR INFORMATION COLLECTION AND DISTRIBUTION

(71) Applicant: Sprint Communications Company L.P., Overland Park, KS (US)

(72) Inventors: Fared A. Adib, Overland Park, KS (US); Joshua R. Cole, Overland Park, KS (US)

(73) Assignee: SPRINT COMMUNICATIONS COMPANY L.P., Overland Park, KS (US)

( * ) Notice: Subject to any disclaimer, the term of this patent is extended or adjusted under 35 U.S.C. 154(b) by 433 days.

(21) Appl. No.: 13/742,051

(22) Filed: Jan. 15, 2013

(51) Int. Cl.
*H04W 24/00* (2009.01)

(52) U.S. Cl.
CPC .................. *H04W 24/00* (2013.01)

(58) Field of Classification Search
CPC ........ H04W 24/08; H04W 4/02; H04W 8/186
See application file for complete search history.

(56) References Cited

U.S. PATENT DOCUMENTS

| | | | |
|---|---|---|---|
| 8,929,877 B2* | 1/2015 | Rhoads et al. | 455/420 |
| 2011/0212717 A1* | 9/2011 | Rhoads et al. | 455/420 |
| 2012/0240183 A1* | 9/2012 | Sinha | 726/1 |
| 2014/0026179 A1* | 1/2014 | Devarajan et al. | 726/1 |
| 2014/0080428 A1* | 3/2014 | Rhoads et al. | 455/88 |
| 2014/0282586 A1* | 9/2014 | Shear et al. | 718/104 |
| 2015/0011194 A1* | 1/2015 | Rodriguez | 455/414.1 |

* cited by examiner

*Primary Examiner* — Diane Mizrahi (57) ABSTRACT

Embodiments relate generally to systems and methods for ad hoc formation of a swarm for information collection and distribution. The swarm may be operable to aggregate information from a plurality of mobile devices in a specific area, wherein the information may be related by subject or category. The swarm may be formed in response to a triggering event, wherein the triggering event may be location based. Once the swarm is formed, it may provide access for users to information which may include photos, videos, audio, location information and environmental information.

15 Claims, 7 Drawing Sheets

AD HOC FORMATION OF A SWARM FOR INFORMATION COLLECTION AND DISTRIBUTION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication of information is common practice with today's technology. Information communicated with mobile devices may include photos, videos, audio recordings, and location information. Sometimes, an event may occur where a large number of people may be taking photos, videos, etc. of a similar subject in a similar area. The information collected by the mobile devices may then be communicated via messaging, uploading, or other means of communication.

SUMMARY

In an embodiment, a method for triggering ad hoc formation of a swarm for information collection and distribution. The method may comprise: monitoring communication traffic from a plurality of mobile devices; recognizing an increase in the monitored traffic; determining a location associated with the increase in monitored traffic; and triggering the formation of a swarm in the location of the increase in monitored traffic, wherein a swarm comprises a computer based system of collecting, storing, and distributing information. The increase in the monitored traffic comprises an increase of at least one of the number of mobile devices in a location, the number of calls being made to an emergency number, the amount of media being captured or uploaded by the mobile devices, wherein media comprises photo, video or audio content, the amount of MMS messages being sent or received by the mobile devices, or the usage of a specific application on the mobile devices;

In an embodiment, a method for triggering ad hoc formation of a swarm for information collection and distribution is disclosed. The method may comprise: detecting the occurrence of a triggering event in a particular area; communicating with a swarm management application based on identifying the triggering event; and notifying the swarm management application to form a swarm in the area of the identified event, wherein the swarm may provide communication with a plurality of mobile devices. The triggering event comprises at least one of: a weather event, an emergency event, a news event, a performance event, a sporting event, a political event, or a celebrity event;

In an embodiment, a method for ad hoc formation of a swarm for information collection and distribution is disclosed. The method may comprise: creating access to storage for information in the form of a swarm; notifying users of the formation of the swarm; aggregating information from users; storing the aggregated information; processing the aggregated information; and providing access to the aggregated information.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Embodiments of the disclosure are directed to methods and systems for ad hoc formation of a swarm for information collection and distribution. In some cases, a "swarm" may also be referred to as a "cloud" or other similar notation. A "swarm" may be defined as a system and associated methods of collecting and distributing information from and to users. Additionally, a swarm may provide temporary storage of the information. In an embodiment, a swarm may comprise a computer system, associated applications, and associated data store. The swarm may be implemented on a single computer system or may be implemented in part by a distributed plurality of computers, for example by processors located at a plurality of base transceiver stations and possibly a centralized computer system. A plurality of swarms may be maintained or supported on a single set of computer and/or data store resources. In some contexts, a swarm may be said to comprise a computer based system of collecting, storing, and distributing information.

The formation of a swarm may occur based on a triggering event, and the swarm may allow for information to be uploaded to or collected by the swarm from users as well as for the stored information to be distributed or accessed by users. A triggering event that may result in the formation of a swarm may be based on an increase in communication traffic of some kind, where the increase in communication traffic may be noticed or monitored by a swarm management application. Traffic that may be monitored may include an increase in one or more of the following: the number of mobile devices in a location, the number of calls being made to an emergency number, the amount of media being captured or uploaded by the mobile devices, the amount of MMS messages being sent or received by the mobile devices, and the usage of a specific application on the mobile devices. The swarm management application operable to monitor the increase in traffic may be executed by a plurality of mobile devices in the area of the increase in traffic, or alternatively the swarm management application may be executed by one or more cell towers (or base transceiver stations) in the area of the increase in traffic. Additionally, the swarm management application may be executed by a central network server in communication with one or more cell towers and/or a plurality of mobile devices.

Alternatively, the triggering event may comprise an event possibly noticed by outside sources (that is, noticed by devices other than mobile devices or cell towers) or optionally noticed by mobiles devices and/or cell towers, wherein the request for the formation of a swarm in the area of the event may be communicated to a swarm management application. For example, an event may comprise one or more of a weather event, an emergency event, a news event, a performance event, a sporting event, a political event, or a celebrity event. The swarm management application operable to initiate formation of a swarm may be executed by a plurality of mobile devices in the area of the event, or alternatively the swarm management application may be executed by one or more cell towers (or base transceiver stations) in the area of the event.

Once a swarm has been formed in an area or location, the swarm may allow for access to storage for information which may be uploaded or otherwise sent to the swarm. Users in the area of the swarm may be notified of the presence of the swarm via a message sent to a plurality of mobile devices, for example, and users may choose to opt-in to or opt-out of communication with the swarm. Then, information may be aggregated from users and access may be provided to users (who may be in the area or elsewhere) who may be interested in information about the event that triggered the formation of the swarm. In some cases, the information that is aggregated by the swarm may be categorized based on the location of the swarm as well as the type of triggering event that initiated the formation of the swarm. Additionally, users may have the option to tag or otherwise categorize the information sent to the swarm from their mobile devices. Information aggregated by the swarm may be stored in a database for later access, analysis and processing.

The formation of a swarm in an area of high communication traffic (or predicted high traffic) may allow for a decrease in use of the network (or network server) in the area of the swarm, wherein users may send information to the swarm instead of uploading the information to the internet or sending it via MMS messages to other devices. For example, a user may want to send a picture to a friend, but instead of sending the actual picture, a link to access the information gathered by the swarm may be sent to the friend so that the friend may have access to all the information in the swarm. In some cases, the swarm may intercept messages and/or uploads being sent by users and suggest accessing the swarm instead. This may reduce the amount of data being sent over a network and may reduce traffic at a particular time, for example, if the friend does not access the link immediately but waits until a later time. Additionally, a collection of information (such as photos or videos, for example) from the area of an event may provide for better analysis by users of the information. For example, public service officials who may be analyzing the scene of a crime may use the information from the swarm to access multiple perspectives, views, or time frames of information.

Figure 1:
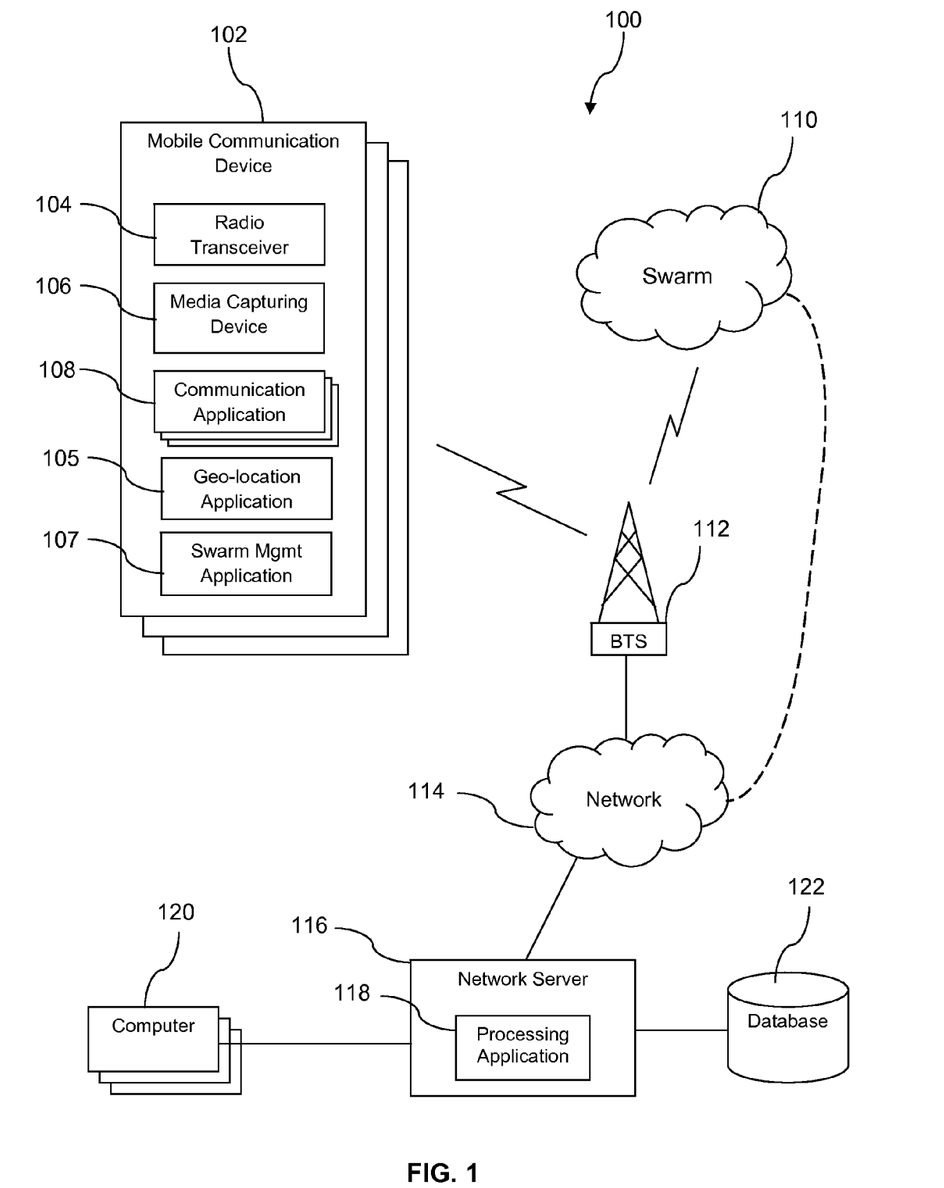
FIG. 1 is an illustration of a communication system according to an embodiment of the disclosure.

Turning now to FIG. 1, a communication system 100 is described. In an embodiment, the system 100 may comprise a plurality of mobile communication devices 102. A mobile device 102 may comprise a radio transceiver 104, a media capturing device 106, a plurality of communication applications 108, an optional geo-location application 105, and an optional swarm management application 107. The mobile device 102 may be configured to use the radio transceiver 104 to establish a wireless communication link with a base transceiver station (BTS) 112, and the base transceiver station 112 may provide communications connectivity of the device 102 to a network 114. The network 114 may comprise any combination of private and public networks. Additionally, the base transceiver station 112 may also be known as a cell tower.

It is understood that the system 100 may comprise any number of mobile communication devices 102 and any number of base transceiver stations 112. The collectivity of base transceiver stations 112 may be said to comprise a radio access network, in that these base transceiver stations 112 may provide radio communication links to the mobile communication devices 102 to provide access to the network 114. The radio access network may be abstracted in different ways and may comprise, in addition to the base transceiver stations 112, servers and data stores such as home location registers (HLRs) or servers that implement the functionality of home location registers, visitor location registers (VLRs) or servers that implement the functionality of visitor location registers, base station controllers (BSCs), mobile switching centers (MSCs), and other network nodes that are specifically associated with providing wireless access and connectivity to the mobile communication devices 102.

The radio transceiver 104 may be in communication with the base transceiver station 112 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol. The device 102 may be any of a mobile phone, a personal digital assistant (PDA), a media player, a wireless enabled computer, a tablet, or other mobile communication device. In an embodiment, the mobile communication device 102 may have other components (not shown) such as a near field communication (NFC) radio transceiver, a wireless local area network (WLAN) radio transceiver, or other components.

The communication applications 108 may comprise a voice communication application, a data communication application, a web browser application, an email application, a short message system (SMS) or texting application, a multimedia message system (MMS) application, and other communication applications. The communication applications 108 may be standard communication applications that are delivered by an original equipment manufacturer (OEM) who assembles the mobile communication device 102. The communication applications 108 may be stored as firmware or software in a trusted memory area of the mobile communication device 102. The communication applications 108 may expose application programming interfaces (APIs) accessible to other applications to provide wireless communication functionality to the other applications.

The geo-location application 105 may be operable to provide a location of the mobile device, wherein a user may access this location information. In an embodiment, the network 114 and/or network server 116 may also access the location information provided by the geo-location application 105. In an embodiment, the geo-location application 105 may comprise a global positioning system (GPS) receiver. Alternatively, the geo-location application 105 may self-locate using trilateration based on signals received from neighboring base transceiver stations 112 or simply based on a location of a neighboring base transceiver station 112.

In an embodiment, the mobile device 102 may be in communication with a swarm 110 operable to allow for information collection and distribution, wherein the swarm 110 may comprise a temporary storage for information which may be aggregated from the plurality of mobile devices. In an embodiment, the swarm management application 107 on the mobile device 102 may facilitate communication with the swarm 110, however in other embodiments, the mobile device 102 may be in communication with the swarm 110 without the presence of a swarm management application 107. Additionally, the swarm management application 107 may be operable to facilitate or initiate formation of a swarm 110 in response to a trigger or triggering event, wherein the swarm management application 107 may be executed by the mobile device(s) 102 and/or the base transceiver station 112. In an embodiment, the mobile device 102 may communicate with the swarm 110 via the base transceiver station 112, wherein the base transceiver station may be coupled to the swarm wirelessly or via a connection between the swarm 110 and the network 114.

In an embodiment the swarm 110 may form in response to a triggering event. In an embodiment, the triggering event may comprise recognizing an increase in communication traffic from a plurality of mobile devices 102, wherein the increase in traffic may be localized to an area. In an embodiment, the traffic may comprise an increase in the number of mobile devices 102 in a particular location or area. The location of the mobile devices 102 may, in an embodiment, be monitored using the geo-location application 105 on the plurality of mobile device 102. In another embodiment, the number of mobile devices 102 in a particular location may be determined by the connection of the mobile devices 102 with the one or more base transceiver stations 112, wherein the one or more base transceiver stations 112 may provide coverage for a specific area or location.

In another embodiment, the communication traffic may comprise an increase in the number of calls being made to an emergency number, such as 911 for example, from the mobile devices 102. The traffic may also comprise the amount of media being captured and or uploaded by the mobile devices 102, wherein the media may comprise photo, video and/or audio content. In an embodiment, the photos, videos, and audio content may be captured by a media capturing device 106 on the mobile communication device 102, wherein the media capturing device 106 may comprise a camera, a video camera, an audio recorder, or other similar device. The amount of media being captured by a device may be monitored by an application on the mobile device 102. Additionally, the amount of media being uploaded by a mobile device 102 may be monitored by an application on the mobile device 102 and/or by the network 114 or network server 116 in communication with the mobile device 102. In another embodiment, the traffic may comprise the amount of messages, such as MMS messages, being sent from the plurality of mobile devices 102, wherein the messages may be sent using a communication application 108 on the mobile device 102. In yet another embodiment, the traffic may comprise the usage of a specific application on the mobile devices 102, wherein the application may be classified as a swarm management application 107 associated with the swarm 110. In other embodiments, the application may be a media sharing application or other similar application on the mobile devices 102.

In an embodiment, the triggering event operable to trigger the formation of a swarm 110 may comprise an event that occurs in a particular area or location, wherein the event may be one or more of the following: a weather event, an emergency event, a news event, a performance event, a sporting event, a political event, or a celebrity event, for example. In an embodiment, an event as described above may be identified or noticed, the location or area of the event may be noted, and then a swarm 110 may be formed in the area or location of the event. In an embodiment, detecting the occurrence of the triggering event may be performed by one or more of a weather service, a news service, an emergency communication service, first responders, or one or more users of the mobile devices.

In an embodiment, a swarm management application 107 may control the formation of the swarm 110 wherein the swarm management application 107 may be executed on the plurality of mobile devices 102. In another embodiment, the swarm management application 107 may be executed at the one or more base transceiver stations 112 (or cell towers). In an embodiment, an external computer 120 or other similar device may communicate with the network server 116 and therefore the network 114, wherein the computer 120 may prompt execution of the swarm management application 107 (by the mobile devices 102 and/or the base transceiver station 112) in response to the identification of a triggering event. In other embodiments, the triggering event may comprise a request by users of the mobile devices 102, wherein a group of users may request the formation of a swarm 110 in their area. This may also be known as a "flash mob" approach. Additionally, the triggering event may, in some embodiments, comprise a request from an authority such as first responders, national weather service, etc.

Once a triggering event has occurred and a swarm 110 is formed, users may be notified of the formation of the swarm 110, wherein, for example, a message may be sent to the plurality of mobile devices 102 notifying a user of the mobile device 102 that they may access the swarm 110. Users may opt-in to or opt-out of communication with the swarm 110 and information may be communicated between the mobile devices 102 and the swarm 110. In an embodiment, information communicated from the mobile devices 102 may comprise photo, video, audio, location information, time information, and/or environmental data. For example, a mobile device may be operable to capture media such as photos, videos, or audios. Additionally, location information may be provided by the geo-location application 105 on the mobile device 102 and/or the location of the base transceiver station 112 in communication with the mobile device 102. Location information may also include orientation, height, or position of a user when a photo or video was taken, for example. Also, time information may be associated with the information gathered from the phone, such as the time that a photo was taken and/or uploaded, for example. Mobile devices 102 may also comprise additional features that may allow environmental information (or data) to be gathered, such as accelerometers, barometers, and other similar devices.

Once information has been communicated to the swarm 110, the information may be made accessible to the mobile devices 102 in communication with the swarm 110. Additionally, the information may be further communicated to a network server 116, wherein the information may be made accessible to other mobile devices 102 and computers 120. In an embodiment, users may subscribe to topics of interest and may be notified when a swarm 100 is formed that is associated with one of their interests. For example, a user may subscribe to celebrity events and may be notified when a swarm 110 forms that is categorized (or otherwise classified) as a celebrity event. The user may then access the information collected by the swarm 110, wherein the user may access the information via a computer 120 or mobile device 102 or other device with internet connectivity. In an embodiment, a user in communication with the swarm that is in the area of the swarm may interact differently than a user who is not in the area of the swarm but is accessing information from the swarm.

In an embodiment, the information may be processed by a processing application 118 on the network server 116, wherein processing the information may comprise categorizing, sorting, filtering or tagging the information. For example, the information may be sorted automatically based on how and/or where the trigger event occurs. Additionally, information may be tagged (or categorized) by users before, after, or during communication of the information to and from the swarm. Information may also be sorted after the event by users of the information. Processing the information may also comprise using the information to create new information, such as compiled (or otherwise edited) photos, videos, or audio, reports of activity and/or traffic, and larger scope or three-dimensional images. Additionally, photo analytics may be performed wherein photos may be identified by their similarity to other photos, for example.

In an embodiment, the information may be analyzed by users, wherein analysis may vary by the type of information and the subject of the information. For example, information may be analyzed by public service officials, security officials, sporting officials, news outlets, reporters, or other interested parties. The users that analyze the information may vary based on the category, location, and the subject of the information. Additionally, users may be charged for access to the information of the swarm. For example, a news outlet may pay the operator of the swarm to have exclusive access to the information aggregated by the swarm.

The swarm 110 may only be considered to "exist" until it produces content (or information), that is, once information is aggregated and/or processed. In an embodiment, information aggregated by the swarm 110 may be routed to a central location (such as a database 122, for example). From there, information may be accessed, stored, altered, or removed at an administrator's discretion and may also be accessed by mobile devices 102 and computers 120. In some embodiments, the aggregated information may be made geographically redundant, wherein the information may be reflected to a server in a location remote from the location of the swarm. For example, information aggregated from New York City may also be stored by servers or databases in Los Angeles. This may be useful especially for emergency or disaster events, where servers and databases proximate to the event may be in danger of being damaged.

Figure 2:
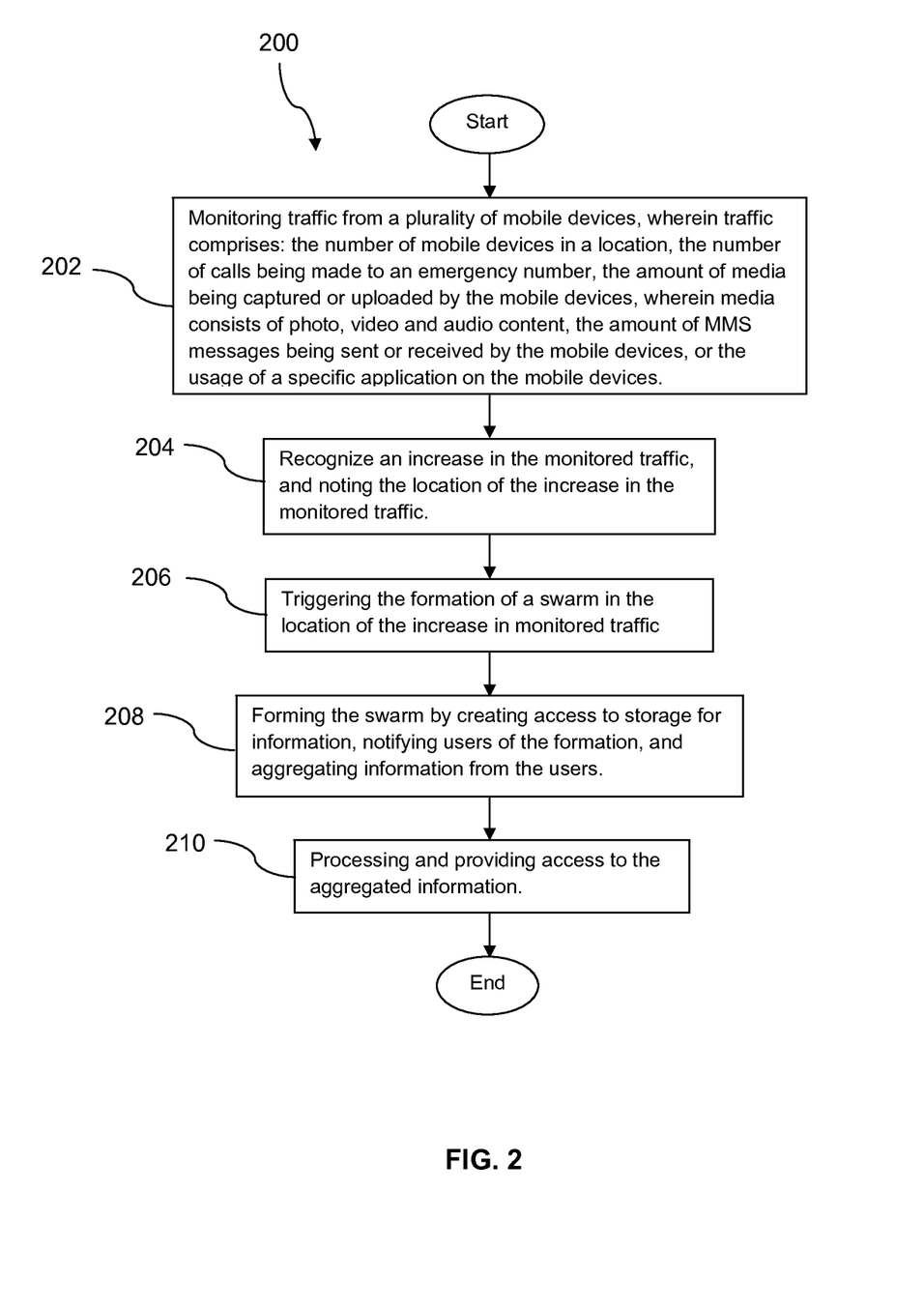
FIG. 2 is a flow chart illustrating a method according to an embodiment of the disclosure.

FIG. 2 illustrates a method 200 for implementing an embodiment of the disclosure. As shown, the method 200 comprises, at block 202, monitoring traffic from a plurality of mobile devices, wherein the monitored traffic may comprise one or more of the following: the number of mobile devices in a location, the number of calls being made to an emergency number, the amount of media being captured or uploaded by the mobile devices, the amount of MMS messages being sent or received by the mobile devices, or the usage of a specific application on the mobile devices. The method 200 may then comprise recognizing an increase in the monitored traffic and noting the location of the increase, at block 204. Then, at block 206, the method may comprise triggering the formation of a swarm in the location of the increase in monitored traffic, and then, at block 208, forming the swarm by creating access to storage for information, notifying users of the formation, and aggregating information from the users. After information has been aggregated by the swarm, the method may comprise processing the information and providing access to the information, at block 210.

Figure 3:
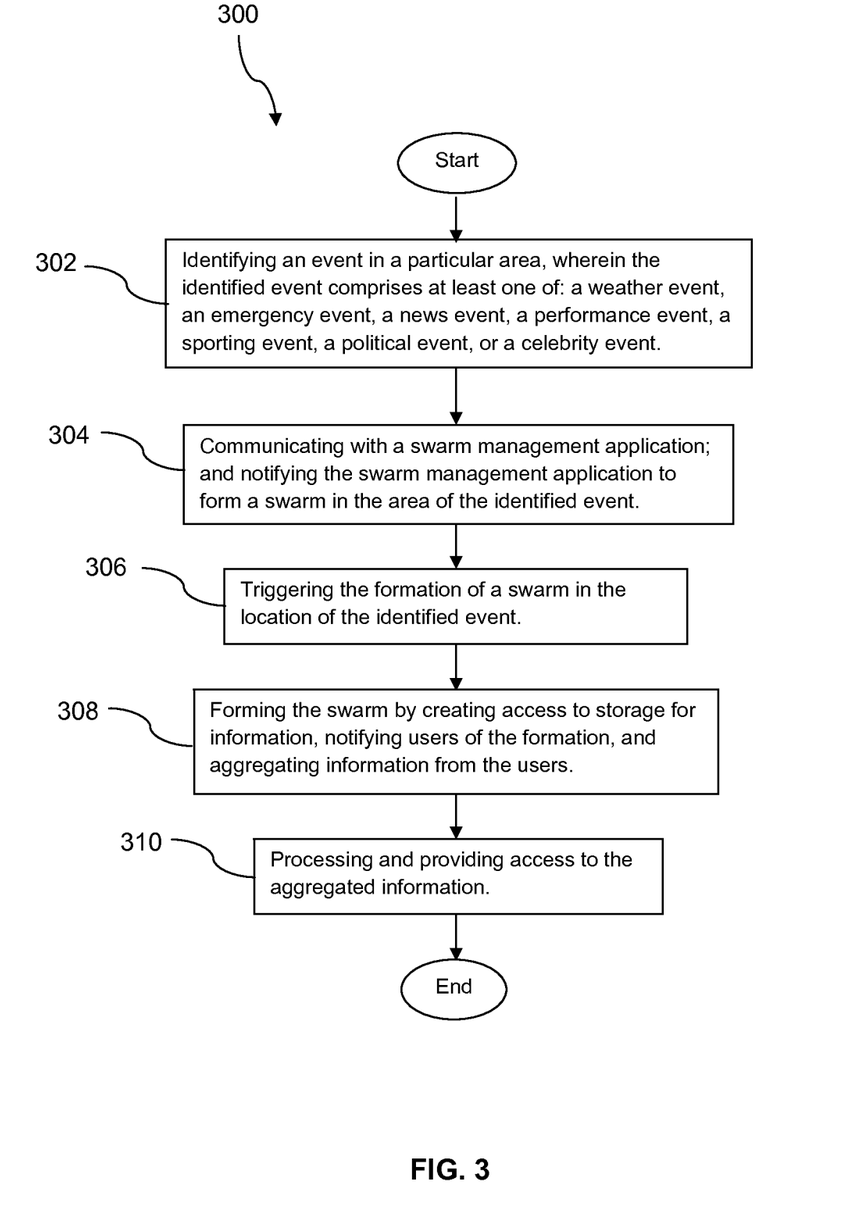
FIG. 3 is a flow chart illustrating another method according to an embodiment of the disclosure.

FIG. 3 illustrates a method 300 for implementing an embodiment of the disclosure. As shown, the method 300 comprises, at block 302, identifying an event in a particular area, wherein the identified event comprises at least one of: a weather event, an emergency event, a news event, a performance event, a sporting event, a political event, or a celebrity event. The method may then comprise communication with a swarm management application and notifying the swarm management application to form a swarm in the area of the identified event, at block 304. Then the swarm management application may, at block 306, trigger the formation of a swarm in the location of the identified event. In an embodiment, the swarm management application may be executed on a plurality of mobile devices, while in another embodiment, the swarm management application may be executed at one or more cells towers in communication with a plurality of mobile devices. The method may then comprise forming the swarm by creating access to storage for information, notifying users of the formation, aggregating information from the users, and storing the aggregated information, at block 308. After information has been aggregated by the swarm, the method may comprise processing the information and providing access to the information, at block 310. In an embodiment, the method 300 may also comprise supplementing the cellular network in the area of the identified event with temporary mobile network coverage, which may for example be in the form of one or more Cell On Wheels (COW). As is known to those of skill in the art, a Cell On Wheels may be a mobile base transceiver station.

Another embodiment of the disclosure may comprise a method of identifying an emergency event, a potential news story or entertainment story, or any other event of interest to the public wherein further investigation may be desired and/or required. Additionally, embodiments of the disclosure may comprise a tool for gathering images and other information related to the above mentioned events and/or stories. This tool may in some cases be known as a swarm 110 or may manage data that collectively may be considered to comprise a swarm or store information related to the swarm and may provide communication with mobile devices 102 in the area of the event or story and may provide temporary ad hoc storage for images and other information gathered from the mobile devices 102.

Figure 4:
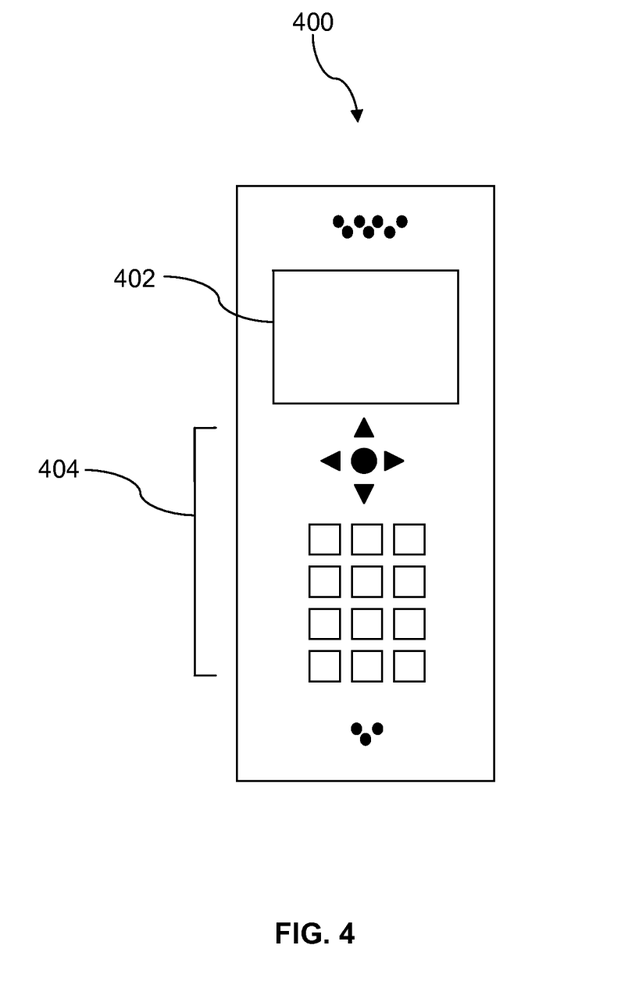
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
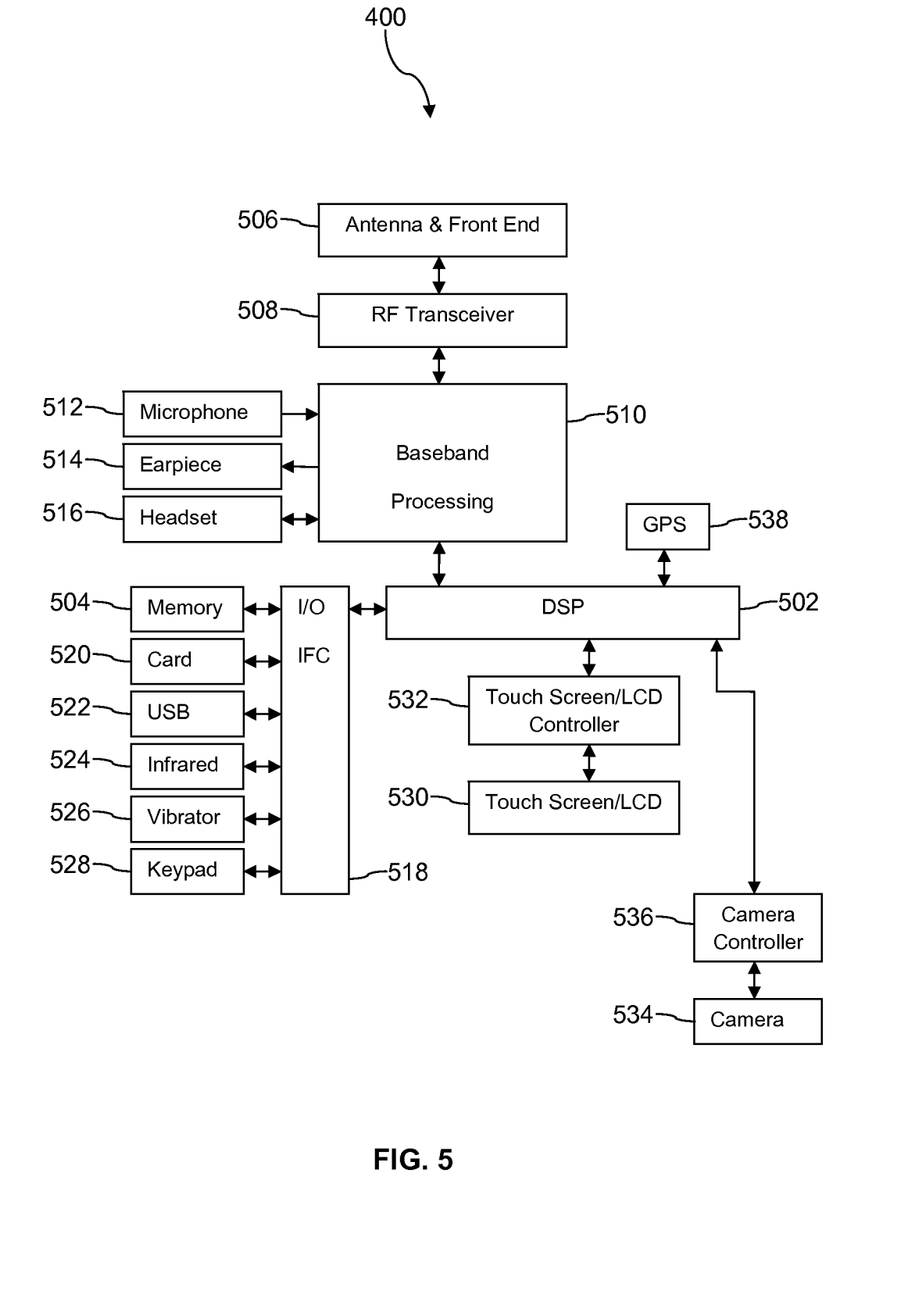
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
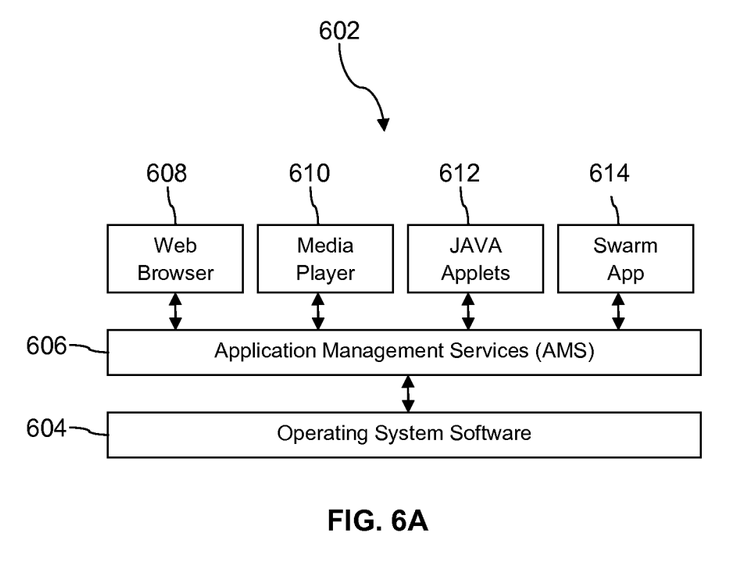
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, JAVA applets 612, and a swarm application 614. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality. The swarm application 614 may comprise a swarm management application as described in FIG. 1 and may be executed by the mobile device to facilitate formation of a swarm and/or communication with a swarm.

Figure 6B:
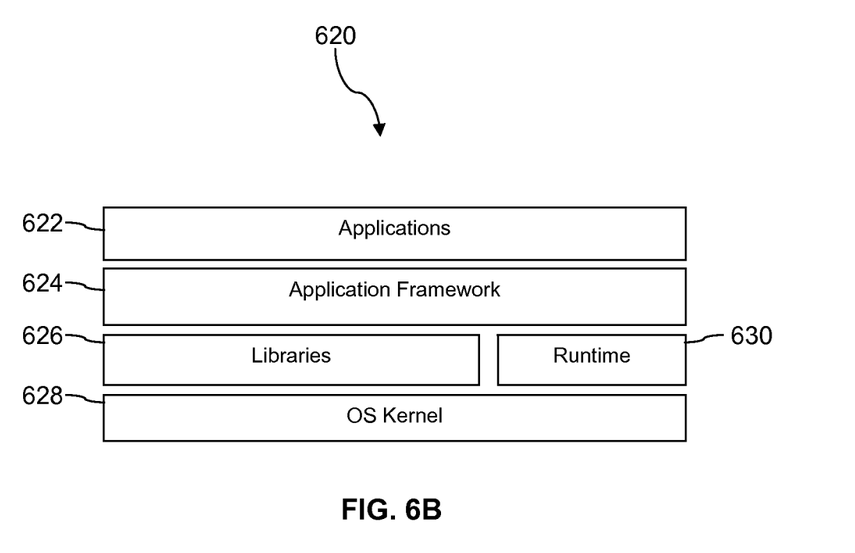
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
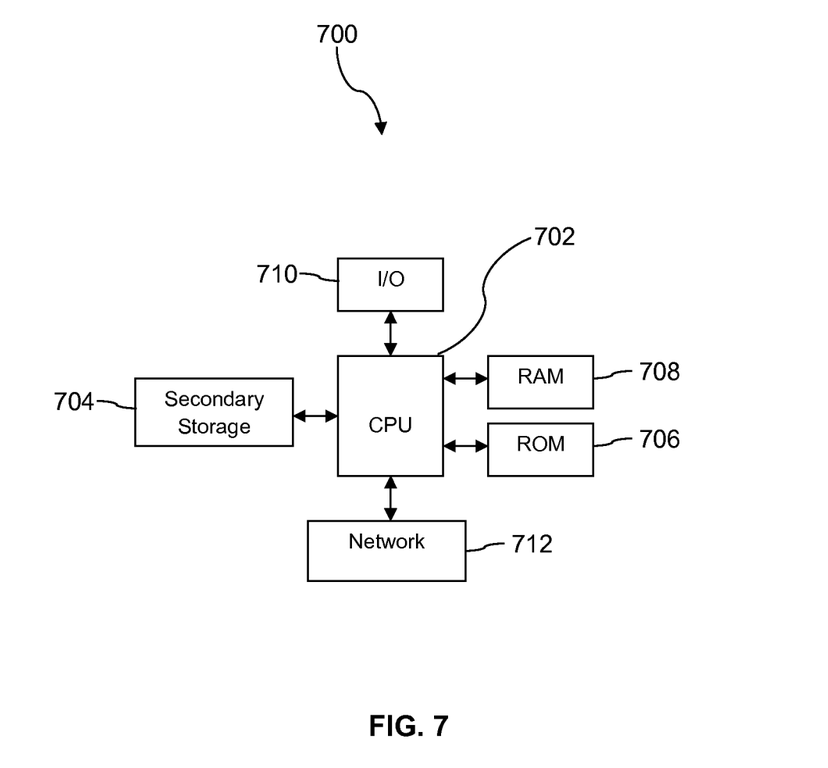
FIG. 7 illustrates an exemplary computer system suitable for implementing the several embodiments of the disclosure.

FIG. 7 illustrates a computer system 700 suitable for implementing one or more embodiments disclosed herein. The computer system 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips.

It is understood that by programming and/or loading executable instructions onto the computer system 700, at least one of the CPU 702, the RAM 708, and the ROM 706 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 704 is typically comprised of one or more disk drives or tape drives and is used for non-volatile storage of data and as an over-flow data storage device if RAM 708 is not large enough to hold all working data. Secondary storage 704 may be used to store programs which are loaded into RAM 708 when such programs are selected for execution. The ROM 706 is used to store instructions and perhaps data which are read during program execution. ROM 706 is a non-volatile memory device which typically has a small memory capacity relative to the larger memory capacity of secondary storage 704. The RAM 708 is used to store volatile data and perhaps to store instructions. Access to both ROM 706 and RAM 708 is typically faster than to secondary storage 704. The secondary storage 704, the RAM 708, and/or the ROM 706 may be referred to in some contexts as computer readable storage media and/or non-transitory computer readable media.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 712 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 712 may enable the processor 702 to communicate with the Internet or one or more intranets. With such a network connection, it is contemplated that the processor 702 might receive information from the network, or might output information to the network in the course of performing the above-described method steps. Such information, which is often represented as a sequence of instructions to be executed using processor 702, may be received from and outputted to the network, for example, in the form of a computer data signal embodied in a carrier wave.

Such information, which may include data or instructions to be executed using processor 702 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 702 executes instructions, codes, computer programs, scripts which it accesses from hard disk, floppy disk, optical disk (these various disk based systems may all be considered secondary storage 704), ROM 706, RAM 708, or the network connectivity devices 712. While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 704, for example, hard drives, floppy disks, optical disks, and/or other device, the ROM 706, and/or the RAM 708 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 704, to the ROM 706, to the RAM 708, and/or to other non-volatile memory and volatile memory of the computer system 700. The processor 702 may process the executable instructions and/or data structures in part by directly accessing the computer program product, for example by reading from a CD-ROM disk inserted into a disk drive peripheral of the computer system 700. Alternatively, the processor 702 may process the executable instructions and/or data structures by remotely accessing the computer program product, for example by downloading the executable instructions and/or data structures from a remote server through the network connectivity devices 712. The computer program product may comprise instructions that promote the loading and/or copying of data, data structures, files, and/or executable instructions to the secondary storage 704, to the ROM 706, to the RAM 708, and/or to other non-volatile memory and volatile memory of the computer system 700.

In some contexts, the secondary storage 704, the ROM 706, and the RAM 708 may be referred to as a non-transitory computer readable medium or a computer readable storage media. A dynamic RAM embodiment of the RAM 708, likewise, may be referred to as a non-transitory computer readable medium in that while the dynamic RAM receives electrical power and is operated in accordance with its design, for example during a period of time during which the computer 700 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for triggering ad hoc formation of a swarm of mobile devices for information collection and distribution comprising:
    monitoring, by a swarm management application executing on at least one mobile device, communication traffic from a plurality of mobile devices, wherein the swarm management application is stored in a non-transitory memory and executed by a processor of each of the plurality of the mobile devices and is stored in a non-transitory memory and executed by a processor of a network server in communication with at least one of the plurality of mobile devices;
    recognizing an increase in the monitored traffic, wherein the increase in the monitored traffic comprises an increase of at least one of:
        a number of mobile devices in a location,
        a number of calls being made to an emergency number,
        an amount of media being captured or uploaded by the plurality of mobile devices, wherein the media comprises photo, video, or audio content,
        an amount of multimedia messaging service (MMS) messages being sent or received by the plurality of mobile devices, or
        usage of a specific application on the plurality of mobile devices;
    determining a location associated with the increase in monitored traffic and the plurality of mobile devices;
    triggering the swarm management application and forming a swarm based on the determined location and the recognition of the increase in the monitored traffic, wherein the swarm comprises a computer based system in communication with the network server and the plurality of mobile devices in the area of the determined location for collecting, storing, and distributing information and messages within the area of the determined location;
    identifying, by the swarm, messages or information initiated by one of the plurality of mobile devices in the area of the determined location and intended for delivery to another mobile device in the area of the determined location via the internet or the MMS;
    in response to the identifying, intercepting, by the swarm, the messages or information intended for delivery to the another mobile device before the messages or information initiated by the one of the plurality of mobile devices are transmitted via the internet or the MMS; and
    in response to the intercepting, sending, by the swarm management application to the another mobile device, a link to access, via the swarm, the messages or the information initiated by the one of the plurality of mobile devices, wherein the swarm provides communication with at least two mobile devices in the area of the increase of monitored traffic.

2. The method of claim 1, wherein the number of mobile devices in the area of the determined location is determined based on location information provided by the mobile devices.

3. The method of claim 1, wherein the number of mobile devices in the area of the determined location is determined by the connection of the mobile devices to at least one cell tower.

4. The method of claim 1, further comprising:
    detecting the occurrence of a triggering event in a particular area, wherein the triggering event comprises at least one of: a weather event, an emergency event, a news event, a performance event, a sporting event, a political event, or a celebrity event;
    communicating with the swarm management application based on identifying the triggering event; and
    notifying the swarm management application to form another swarm in the area of the identified triggering event, wherein the other swarm provides communication with two or more mobile devices.

5. The method of claim 4, wherein the occurrence of the triggering event corresponds with one or more of a weather service, a news service, an emergency communication service, first responders, or one or more users of the plurality of mobile devices.

6. The method of claim 4, further comprising supplementing the cellular network in the area of the identified triggering event with temporary mobile network coverage.

7. The method of claim 1, further comprising:
allowing mobile devices access to storage for information received by the swarm;
notifying the mobile devices of the ad hoc formation of the swarm;
aggregating information from one or more of the mobile devices;
storing the aggregated information in a non-transitory memory that is accessible to the swarm;
processing the aggregated information; and
providing the mobile devices access to the stored aggregated information.

8. The method of claim 7, wherein notifying the mobile devices of the formation of the swarm comprises sending a message to the mobile devices within the area of the swarm formation, wherein the mobile devices may opt-into or opt-out of participation in the swarm.

9. The method of claim 7, wherein processing the aggregated information comprises categorizing the information, and wherein the categorizing is done based on a trigger or automatically.

10. The method of claim 9, wherein categorizing the information comprises sorting, filtering, or tagging.

11. The method of claim 9, wherein processing the aggregated information further comprises analyzing the information.

12. The method of claim 1, wherein recognizing the increase in the monitored traffic is based on the amount of media being captured or uploaded by the plurality of mobile devices, wherein the media comprises at least one of photo data, video data, audio data, or any combination thereof.

13. The method of claim 7, wherein aggregating information from the one or more mobile devices comprises accessing information from the one or more mobile devices, and wherein the information comprises at least one of: a photo, a video, an audio, location information, time information, or environmental data.

14. The method of claim 13, wherein aggregating information from the one or more mobile devices comprises accepting information pushed to the swarm by the one or more mobile devices.

15. The method of claim 13, wherein aggregating information from the one or more mobile devices comprises pulling information from the one or more mobile devices.

* * * * *